US008433624B1

(12) United States Patent
Rempe

(10) Patent No.: US 8,433,624 B1
(45) Date of Patent: Apr. 30, 2013

(54) MOBILE ITEM-PURCHASING SYSTEM

(75) Inventor: Nathan D. Rempe, Lincoln, NE (US)

(73) Assignee: Nebraska Book Company, Inc., Lincoln, NE (US)

( * ) Notice: Subject to any disclaimer, the term of this patent is extended or adjusted under 35 U.S.C. 154(b) by 543 days.

(21) Appl. No.: 12/367,837

(22) Filed: Feb. 9, 2009

Related U.S. Application Data

(60) Provisional application No. 61/077,936, filed on Jul. 3, 2008.

(51) Int. Cl.
*G06Q 30/00* (2006.01)

(52) U.S. Cl.
USPC .............. 705/26.9; 705/26.1; 705/27.1

(58) Field of Classification Search ............ 705/26.1, 705/27.1, 26.9
See application file for complete search history.

(56) References Cited

U.S. PATENT DOCUMENTS

| | | | |
|---|---|---|---|
| 6,154,738 A * | 11/2000 | Call | 707/4 |
| 6,587,835 B1 * | 7/2003 | Treyz et al. | 705/14.64 |
| 7,395,247 B2 * | 7/2008 | Sokei et al. | 705/400 |
| 7,769,638 B1 * | 8/2010 | Mollett et al. | 705/26.1 |
| 2003/0065805 A1 * | 4/2003 | Barnes, Jr. | 709/231 |
| 2003/0229537 A1 * | 12/2003 | Dunning et al. | 705/10 |
| 2005/0071249 A1 * | 3/2005 | Nix et al. | 705/26 |
| 2006/0029911 A1 * | 2/2006 | Monk et al. | 434/107 |
| 2006/0253338 A1 * | 11/2006 | Metzger | 705/26 |
| 2006/0265335 A1 * | 11/2006 | Hogan et al. | 705/65 |
| 2008/0004981 A1 * | 1/2008 | Gopalpur et al. | 705/26 |
| 2009/0254476 A1 * | 10/2009 | Sharma et al. | 705/39 |

OTHER PUBLICATIONS http://ocolly.com/2006/12/12/students-trade-books-for-cash/ [retrieved on Jun. 5, 2009].*
http://web.archive.org/web/20070301214548/www.reslife.okstate.edu/housing/halldesc.php?hall=2&nav=3 from Mar. 12 2007 [retrieved on Jun. 5, 2009].*
"USU offers drive-through book buyback", by Arrin Newton Brunson, The Salt Lake Tribune [Salt Lake City, Utah], Apr. 30, 2008.*

* cited by examiner

*Primary Examiner* — Jeffrey A Smith
*Assistant Examiner* — Anne Georgalas
(74) *Attorney, Agent, or Firm* — Alan G. Rego; Westman, Champlin & Kelly, P.A.

(57) ABSTRACT

A remote item-purchasing device and method. The method includes entering identification information for a physical item for sale by a seller into a mobile item-purchasing device. The method also includes, in response to entering the identification information for the item for sale into the mobile item-purchasing device, electronically obtaining, via the mobile item-purchasing device, a purchase price for the item for sale. The electronically obtained purchase price is utilized as a guide price for purchasing the item for sale from the seller.

18 Claims, 4 Drawing Sheets

MOBILE ITEM-PURCHASING SYSTEM

The present application claims priority to U.S. Provisional Application Ser. No. 61/077,936, filed Jul. 3, 2008 and entitled "REMOTE ITEM-PURCHASING SYSTEM," the content of which is hereby incorporated by reference in its entirety.

FIELD

The present embodiments relate to purchasing of items. More particularly, the present embodiments relate to a mobile item-purchasing device and process.

BACKGROUND

In general, business arrangements between suppliers and retailers are set up such that the retailer places an order for items with the supplier and the supplier ships or otherwise transfers the items to the retailer, thereby satisfying the order. However, certain retailers, such as college bookstores, often purchase used books from students and then resell the used books. Here, the decision to sell the used books is typically made by the student independently of the bookstores. Also, the student has to approach the bookstore, or at least post a book for sale in an on-line book selling and purchasing marketplace, before the bookstore can make a decision to purchase the book. This results in missed selling and buying opportunities.

SUMMARY

A mobile item-purchasing device and method is provided. The method includes entering identification information for a physical item for sale by a seller into a mobile item-purchasing device. The method also includes, in response to entering the identification information for the item for sale into the mobile item-purchasing device, electronically obtaining, via the mobile item-purchasing device, a purchase price for the item for sale. The electronically obtained purchase price is utilized as a guide price for purchasing the item for sale from the seller.

This summary is not intended to describe each disclosed embodiment or every implementation of the mobile item-purchasing system. Many other novel advantages, features, and relationships will become apparent as this description proceeds. The figures and the description that follow more particularly exemplify illustrative embodiments.

While the above-identified figure sets forth one embodiment of the mobile item-purchasing system, other embodiments are also contemplated, as noted in the disclosure. In all cases, this disclosure presents the mobile item-purchasing system by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Disclosed is a mobile item-purchasing device and method. The mobile item-purchasing device can easily be transported to a seller's location at which items for sale by the seller can be purchased with the help of the device.

Figure 1:
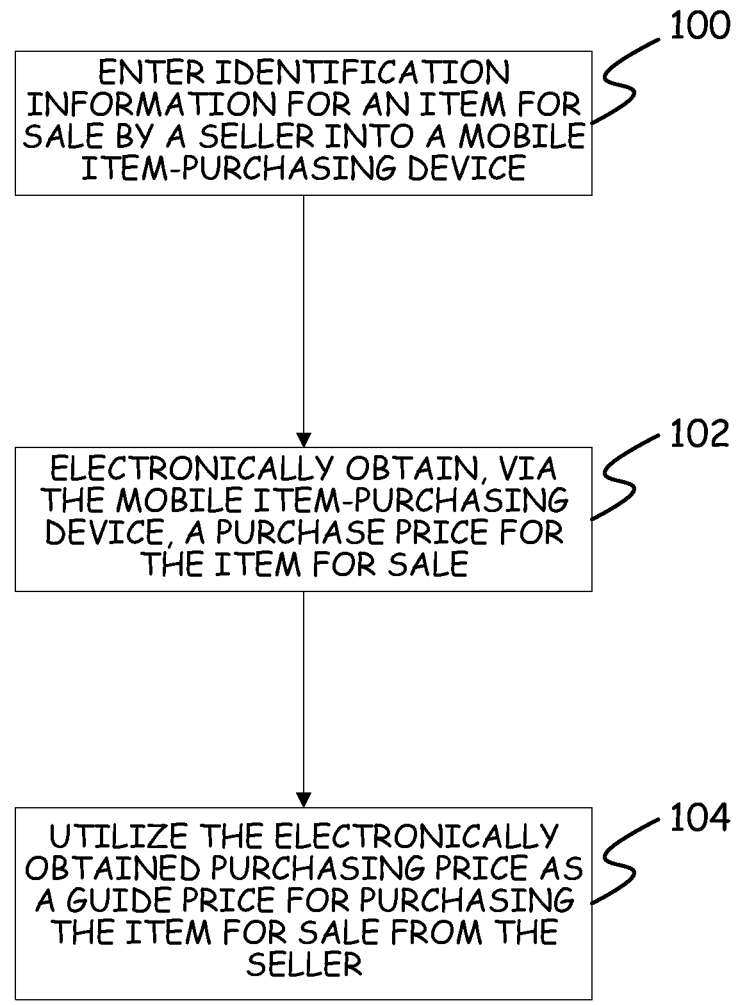
FIG. 1 is a simplified flow diagram of a method of purchasing items from a seller using a mobile item-purchasing device.

FIG. 1 is a simplified flow diagram of a general embodiment of a method of purchasing items from a seller using the mobile item-purchasing device. At step 100, identification information for an item for sale by a seller is entered into the mobile item-purchasing device. Entering identification information for the item for sale can involve scanning optically detectable indicia (e.g., bar-coded identification information) from the item or a package that contains the item, obtaining information from a radio frequency identification (RFID) tag on the item or a package that contains the item, manually entering the identification information for the item into the mobile item-purchasing device using a keypad of the device, for example, or using any other suitable information entry technique. In response to entering the identification information for the item for sale into the mobile item-purchasing device, a purchase price for the item for sale is electronically obtained via the mobile item-purchasing device. This is shown in step 102 of FIG. 1. If multiple items are for sale by the seller, pricing information can either be obtained one item at a time after each item is scanned (single-scan mode) or once after all items are scanned (multi-scan mode). It should be noted that the purchase price for the item can be determined by a software process that can use one or more pricing information sources to make the purchase price determination. Also, the software process can factor in a location at which the purchase is taking place to make the purchase price determination. If the mobile item-purchasing device is GPS-enabled, the location can be determined by the software using the GPS information. At step 104, the electronically obtained purchase price is utilized as a guide price for purchasing the item for sale from the seller. In accordance with some of the present embodiments, the mobile item-purchasing device is also used to issue a payment to the seller for the item. In some embodiments, the mobile item-purchasing device is configured to issue the payment using at least one of a pre-paid debit card technique, a paper check-based technique, an electronic payment technique and a cash transaction technique. In general, any suitable method of issuing payments with the help of the mobile item-purchasing device can be used.

Figure 2:
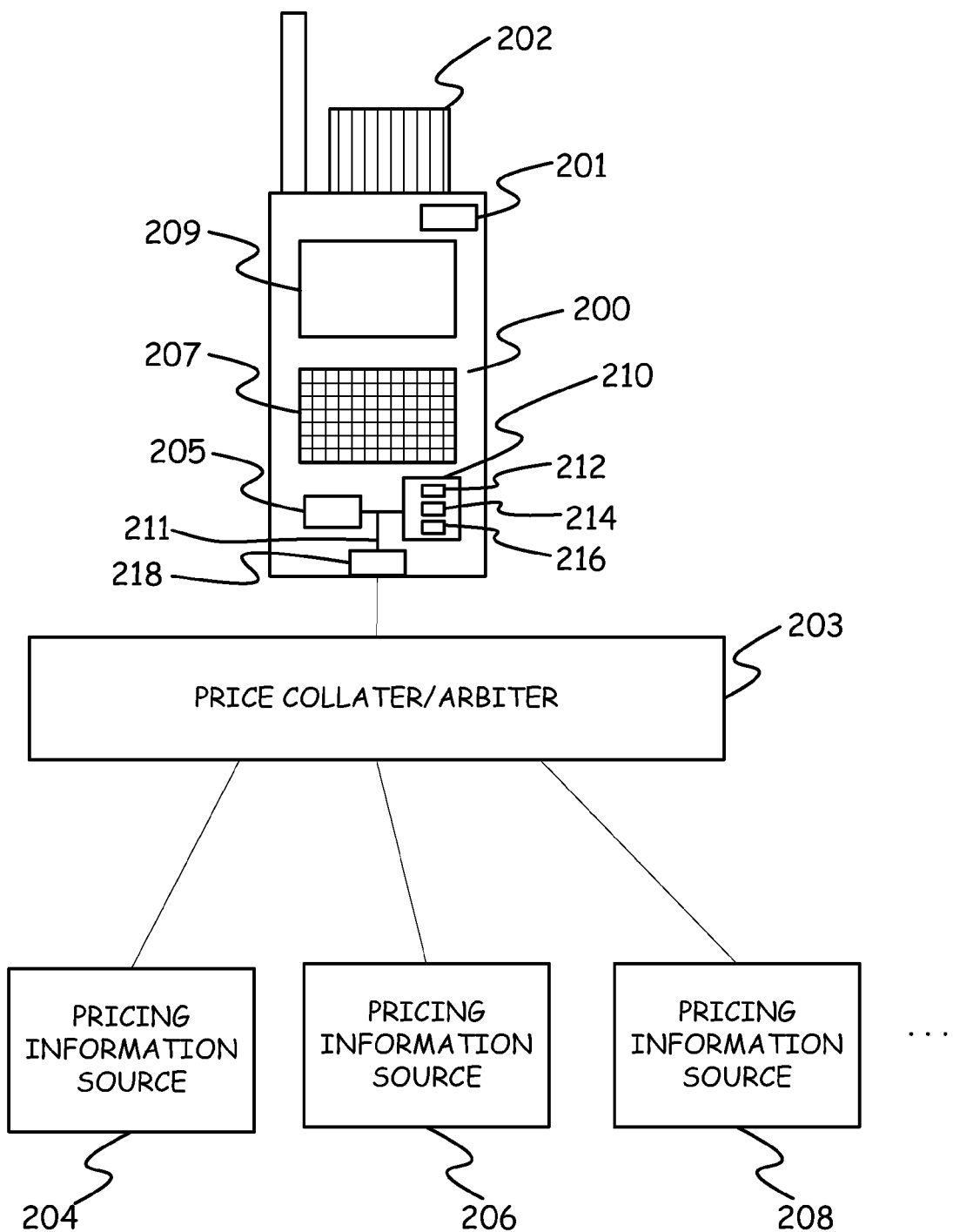
FIG. 2 is a simplified block diagram of a mobile item-purchasing system.

In summary, as can be seen in FIG. 2, a mobile item-purchasing device 200 with an attached barcode scanner 202, for example, for obtaining item identification information is provided. In the embodiment of FIG. 2, mobile item-purchasing device 200 is GPS-enabled (includes GPS feature 201). In some embodiments, mobile device 200 includes a microprocessor 205, memory 210, input component(s) 207, output component(s) 209, and a communication interface 218 for communicating with remote computers or other mobile devices. In one embodiment, the afore-mentioned components are coupled for communication with one another over a suitable bus 211. For simplification, connections of bus 211 to input component(s) 207 and output component(s) 209 are not shown in FIG. 2.

Memory 210 is implemented as non-volatile electronic memory such as random access memory (RAM) with a battery back-up module (not shown) such that information stored in memory 210 is not lost when the general power to mobile device 200 is shut down. A portion of memory 210 is preferably allocated as addressable memory for program execution, while another portion of memory 210 is preferably used for storage, such as to simulate storage on a disk drive or any computer storage medium.

In one embodiment, memory 210 includes an operating system 212, application programs 214 as well as an object store 216. During operation, operating system 212 is preferably executed by processor 205 from memory 210. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 218 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 218 can be an infrared transceiver or a serial or parallel communication connection, all of which are capable of transmitting streaming information. In some embodiments, mobile device 200 is also Internet-enabled.

Input and output components 207 and 209 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The mobile device 200 is programmed in accordance with some of the present embodiments to, after receiving the item identification information, communicate (using wired or wireless communication) with one or multiple pricing information sources 204, 206, 208, etc., for example, to obtain a purchase price of the item. Typically, a price collater/arbiter 203 is included between the mobile device and the pricing information sources. Price collater/arbiter 203, which can comprise a server with software stored on a computer storage medium and executed by a processor, receives item identification information from the mobile device 200, obtains salability and pricing information for the item from the pricing information sources 204, 206 and 208, computes a single purchase price for the item from the information obtained from the pricing information sources 204, 206 and 208, and returns the single purchase price to the mobile device 200. Once the purchase price is obtained and the seller agrees to purchase the item, as noted above, the mobile item-purchasing device is used to issue a payment to the seller for the item. Typically, multiple mobile item-purchasing devices communicate with the multiple pricing information sources 204, 206, 208, etc. However, for simplification, only one mobile item-purchasing device is shown in FIG. 2. On a college campus, for example, every dormitory resident assistant (RA) (or fraternity president) could be armed with a mobile item-purchasing device—allowing the retailer (college bookstore, for example) to deliver an extremely cost effective mobile buy-back mechanism for used books directly to the student's doorstep—extending the product acquisition arm out to meet the suppliers rather than requiring them to go to the retailer. Historical information related to the purchase of each item using the mobile item-purchasing device is maintained. In general, the historical information is utilized to help in future item acquisition and product/item marketing.

Currently, as noted earlier, college bookstores (or bookstores, in general) that buy (or buy back) used books rely on the students to bring the used books to the bookstore and receive payments for the used books at the bookstore. One general concept of the present embodiments is to eliminate the need for the students to bring the used books to the bookstore and instead use affiliates of the bookstore to go to the students, ask them if they have any books for sale, provide them with buy back prices for any books that they may want to sell, and pay them for any books that they decide to sell. As described above, the purchase price determination and payment process is carried out with the help of a mobile item-purchasing device such as device 200. In some embodiments, mobile device 200 is configured to communicate with an inventory control system of the buyer (e.g., the bookstore). The inventory control system can be a pricing information source, can provide a buying list to device 200 and can also be updated from device 200 substantially in real-time with purchasing information each time a book on the buying list is purchased, for example. Thus, any of pricing information sources 204, 206 and 208 can be an inventory control system in which suitable software is stored on a computer storage medium and executed by a processor. Also, when the pricing information source is an inventory control system, instead of providing pricing information to mobile device 200 in real-time each time a price request is submitted from the mobile device 200, pricing information for an entire buying list can be periodically provided by the inventory control system to the mobile device 200. This pricing information can be stored in memory 210 of mobile device 200 and thus be available locally on the device. In a specific embodiment, mobile device 200 communicates with the inventory control system of the bookstore every time a book is purchased in the field. The communication involves providing information such as the title of the book and/or other identification information for the book, and possibly identification information for the mobile device and/or the affiliate, to the inventory control system. The communication is usually sent to the inventory control system of the nearest retail location (referred to herein as a "home store") of the bookstore. The affiliate either takes the purchased books to the home store or ships the purchased books to the home store. Since the inventory system of the home store is electronically updated in advance with identification for the purchased books, receiving the purchased books at the home store involves reconciling the physical purchased books brought, or shipped, by the affiliate, with the stored purchasing information. The reconciliation can be carried out by scanning identification information for the physical purchased books at the home store. It should be noted that the reconciliation is built into the inventory control system and not into the mobile device. In some embodiments, the inventory control system notifies the mobile device that "it is time to reconcile" based on predetermined conditions, such as the elapsing of a predetermined time period since the last reconciliation was carried out, or any other suitable condition or conditions. The affiliate receives a commission on the books received and is charged for any books that are delinquent.

Figure 3:
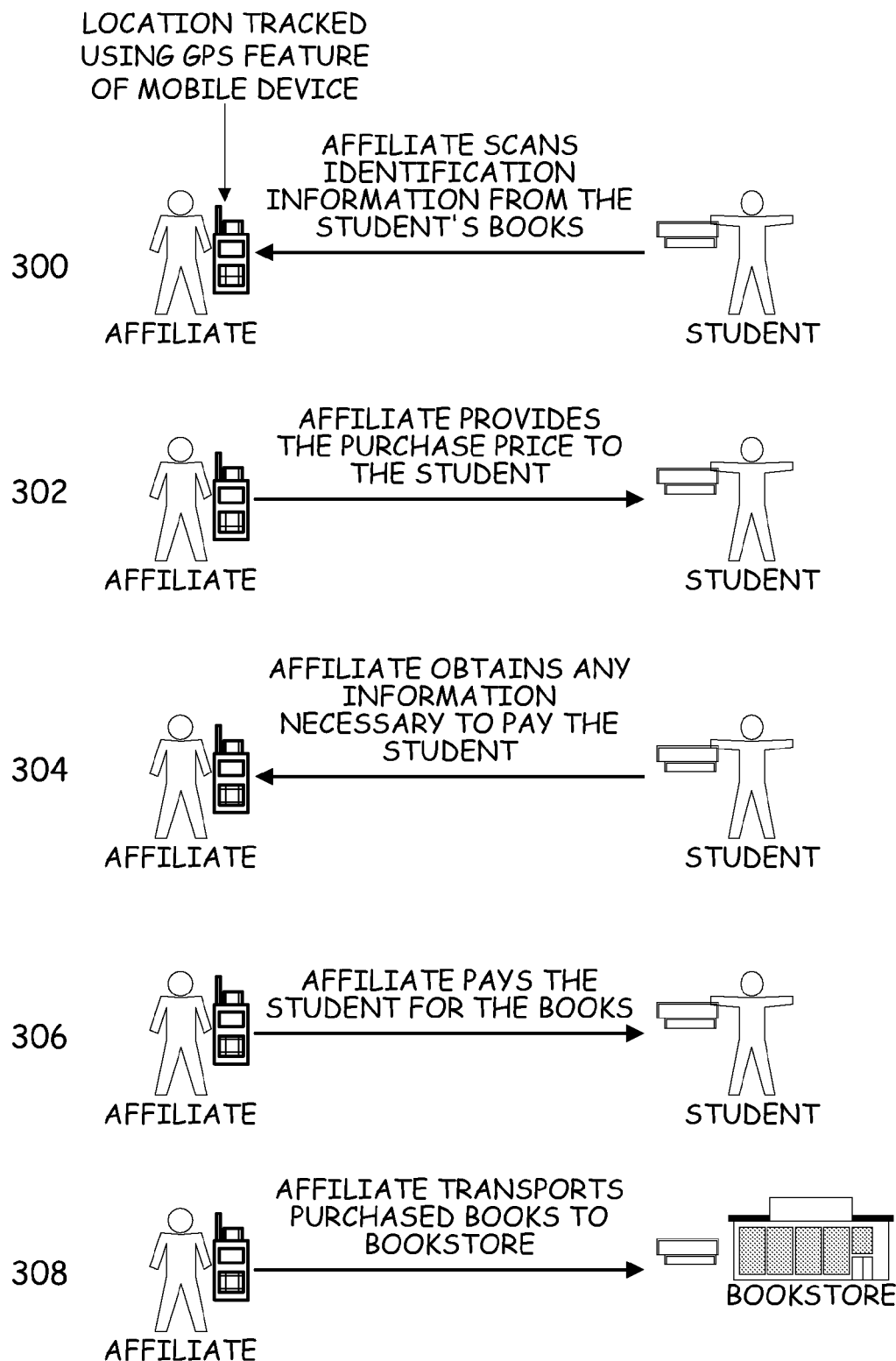
FIG. 3 is a diagrammatic illustration showing an affiliate at a student residence, for example, purchasing used books.

FIG. 3 shows an affiliate armed with a mobile item-purchasing device at a student residence, for example, purchasing used books. As indicated above, in some embodiments, the affiliate's location is tracked using the GPS feature (such as 201 of FIG. 2) of the mobile item-purchasing device (such as 200 of FIG. 2). At step 300, the affiliate scans identification information from the student's books, using a mobile item-purchasing device, to obtain a purchase price for the book(s). The purchase price is obtained in a manner described in connection with FIG. 2. At step 302, the affiliate provides the purchase price to the student. In some embodiments, the purchase price provided by the affiliate to the student is a non-negotiable price. In other embodiments, the purchase price is a negotiable guide price. If the student agrees to sell the books, at step 304, the affiliate obtains any information necessary to pay the student with the help of the mobile device. At step 306, the affiliate enters the obtained information into the mobile device and completes the payment process with the help of the mobile device. At step 308, the affiliate transports the purchased books to the bookstore where reconciliation is carried out in a manner described above. As indicated above, using GPS, the mobile item-purchasing device (such as 200 of FIG. 2) can be tracked to report back (to price collater/arbiter 203 and/or any datacenter of the mobile item-purchasing system) purchase locations and times and the current location of the mobile item-purchasing device.

As noted above, different methods of issuing payments for purchased items can be carried out using the mobile item-purchasing device. Details of some example methods of issuing payments are as follows:

1) Pre-Paid Debit Card

Figure 4:
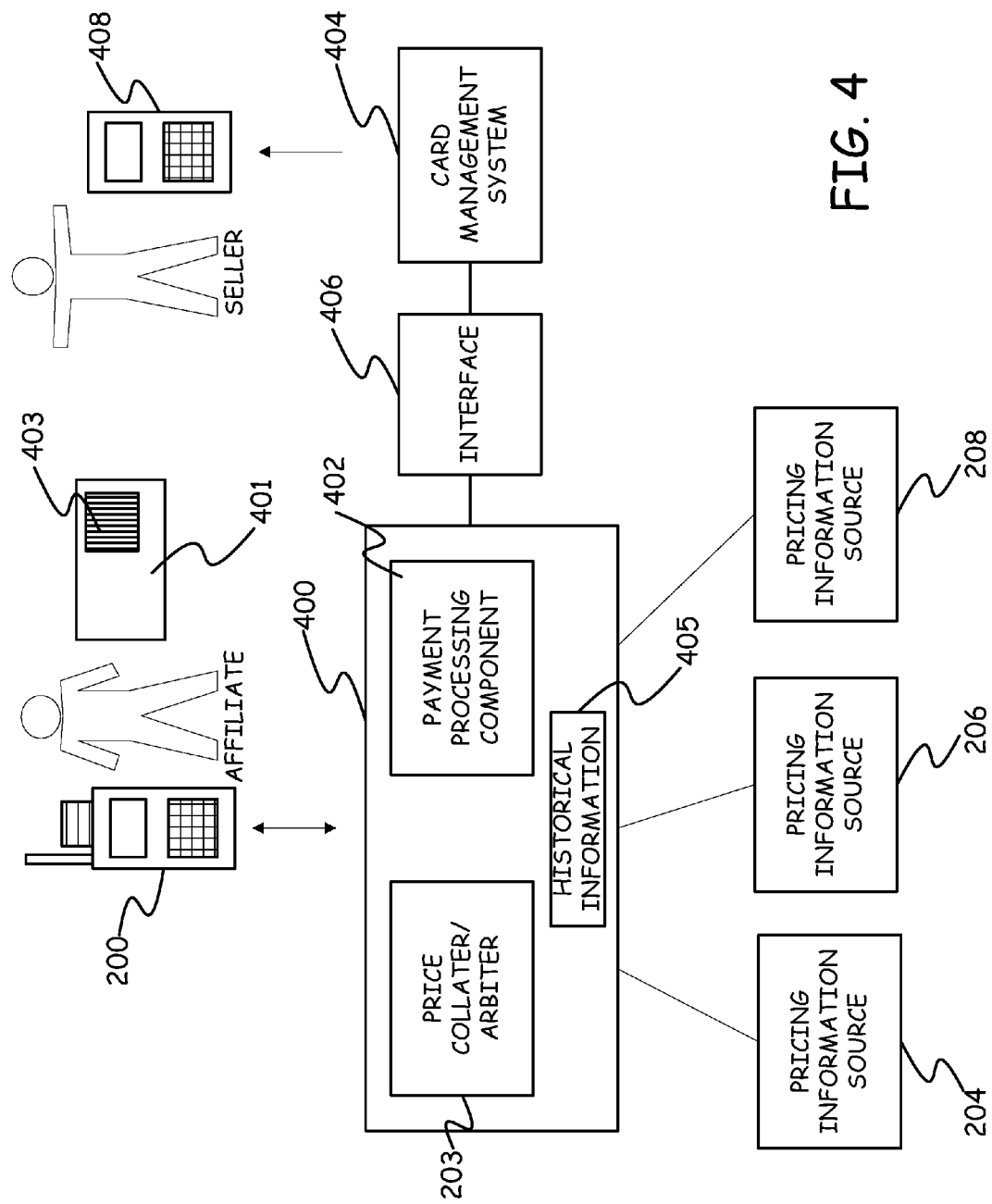
FIG. 4 shows one embodiment of a system for purchasing items, with the help of a mobile item-purchasing device, using a pre-paid debit card as one payment option.

FIG. 4 shows one embodiment of a system for purchasing items, with the help of a mobile item-purchasing device, using a pre-paid debit card as one payment option. An affiliate (or, in general, a buyer's agent) is armed with a stack of "non-activated" pre-paid debit cards with each card in the stack including a printed International Organization for Standardization (ISO) barcode, on the card, for example, which securely represents a transaction account number in barcode form that is linked to the card. FIG. 4 is similar to FIG. 2, but additionally shows price collater/arbiter 203 within a datacenter 400, which also includes a payment processing component 402 which is capable of communicating with a card management system 404 via an interface 406. Card management system 404 is typically owned and maintained by an entity that is different from an entity that owns and operates datacenter 400 and the mobile item-purchasing device(s) 200. In FIG. 4, the debt card and the ISO barcode are represented by reference numerals 401 and 403, respectively. Historical information related to the purchase of each item using the mobile item-purchasing device is represented as box 405, which can be a separate memory. As noted earlier, in general, the historical information is utilized to help in future item acquisition and product/item marketing.

Once a transaction is ready to be completed and payment is to be issued, the buyer's agent/affiliate selects a non-activated card to be activated from his/her stack of non-activated pre-paid debit cards, scans (using the barcode scanner on the mobile item-purchasing device) the secure ISO barcode (barcoded transaction account number) 403 on the card 401 and inputs a cellular phone number, for example, of the seller into the mobile item-purchasing device 200 to complete payment. Once this data is entered into the mobile item-purchasing device 200 and submitted from the mobile item-purchasing device 200 to payment processing component 402, component 402 sends a request, containing the transaction account number, to card management system 404 to retrieve the card number. In response to the request for card number information, card management system 404 returns the card number to component 402. The card number is then used by payment processing component 402 in subsequent requests to perform other card-related functions. Specifically, using the card number retrieved from component 404 in the previous request, a request, which includes the seller's cell phone number, is sent by component 402 to component 404 to update information on the card account. Another request is submitted from component 402 to component 404 to change the cardholder's PIN to be the last 4 digits, for example, of the seller's cell phone number. A request is then sent from component 402 to component 404 to activate the card. This is followed by a request with the amount of money to load on the card. After the final request is processed, the system sends a SMS message to the seller's phone 408 indicating funds have been added to the seller's card.

2) Paper Check-Based Technique

In this technique, a payment is completed by sending a paper check to the seller's choice of address. Thus, the seller's address information has to be input into the mobile item-purchasing device. An option to also deliver an instant text/email based payment receipt (with payment claim number and information to access transaction history via a web site, for example) is also included.

3) PayPal/Amazon Text Mobile Payments (with Text Message Based Confirmation)

Here, the seller provides (and confirms) a cell phone number to be paid and payment is substantially immediately issued to the specified device via text message.

4) Cash Transaction Technique

A cash transaction override is also provided for situations where reimbursement needs to take place quickly and efficiently with no seller input.

In general, any of the above payment methods can be used by the bookstore to pay the affiliate commission for purchased books. For example, the same type of debit cards that the affiliate uses to pay the students for purchased books can also be used by the affiliate for self-payment of commission on reconciled books. For example, once the affiliate has built up a $50 commission, the affiliate can load that commission onto one of the debit cards using the scanning process described above.

Although the specific embodiments described above include examples of the mobile item-purchasing device being utilized to purchase books, the mobile item-purchasing device (and the central system driving it (for example, datacenter 403)) has the ability to evaluate salability, risk and calculate a purchase price, for example, on any video game, CD, or DVD with a valid International Standard Book Number (ISBN) or Universal Product Code (UPC). A search by title, which is especially useful for items that do not include an ISBN or UPC, is also an option in some embodiments. Information on the pricing and salability mechanism for video game, CD, or DVD items varies slightly from textbooks in some embodiments. These variations are outlined in a specific example of a salability evaluation and purchase price calculation process (carried out, for example, within collater/arbiter 203), which is as follows:

1) In the examples provided earlier, the arbiter/collater 203 is shown communicatively coupled to a single mobile item-purchasing device. However, as indicated earlier, collater/arbiter 203 is capable of communicating with a number of mobile item-purchasing devices at different locations. Thus, on each purchase price request, each mobile item-purchasing device identifies itself to collater/arbiter 203 by communicating its unique identification number such as its phone number (or logged in user in the event a phone number is not available). In general, collater/arbiter 203 interacts separately with each mobile item-purchasing device, thereby allowing for a process which can be modified remotely between scans/requests on a device-by-device basis, giving the ability to orchestrate purchase prices across a country, for example, in a real-time fashion (even based on real-time marketplace sales or buying at other areas of the country, which are remote from any particular mobile item purchasing device being used). In addition, some embodiments provide the capability to disable the ability to purchase by product type, allowing only certain devices to, for example, purchase video games.

In general, an item being scanned is evaluated across multiple price sources prior to a purchase price being determined. If the item is a book, in a specific embodiment, it may be evaluated against the following price sources, in the following order of operation:

1) Identified local bookstore buying list,
2) Aggregated buying list from multiple bookstores across the country,
3) A Wholesale Buyers Guide, and
4) Real-time online marketplace price and salability data.

It should be noted that online salability data could be used at all tiers of price evaluation to help determine risk.

In some embodiments, collater/arbiter 203 includes sufficient built-in intelligence to partition purchases to the correct bookstores in the event an aggregated buying list is used.

Typically, a number of variables are important in determining re-salability and price of an item being evaluated. The following is an example list of configuration items evaluated, by price collater/arbiter 203, on each scan (or ultimately each item if the mobile item-purchasing device is in multi-scan mode):

a. Phone number or login credentials of requesting phone,
    b. Maximum per title purchase quantity (globally affects all items),
    c. ISBN/UPC Override List (allows for completely blocking or setting a static purchase price or purchase quantity on any title),
    d. Maximum Sales Rank Threshold, based on product category, is a number, obtained from Amazon's Sales Ranking System, that exhibits how any particular book is selling. The lower the number reflected in the Sales Ranking System for a particular type of item, the higher the sales for that type of item. The calculation is based on sales and is updated each hour to reflect recent and historical sales of every item sold (e.g., a maximum sales rank threshold (i.e., no purchase authorized) may be set at: 300,000 for Textbooks; 2,200 for Video Games and DVDs),
    e. Resale Risk Buffer (RRB) Matrix, customizable by a profile making the request, is a formula that utilizes the Maximum Sales Rank Threshold for controlling resale risk. The following is an example that discounts the item purchase price in proportion with the Maximum Sales Rank Threshold.

| % of Maximum Sales Rank Threshold | % Purchase price Reduction |
|---|---|
| <=100 | 20% |
| <=80 | 15% |
| <=60 | 10% |
| <=40 | 5% |
| <=20 | 0% |
| <=10 | -2.5% |
| <=5 | -2.5% | f. Minimum Marketplace Selling Price e.g., (Default: $7.00 for Textbooks; $5.00 for Video Games and DVDs),
    g. Marketplace Lowest Price Calculation Type (Absolute Lowest, Default: Average of Lowest 3, Average of Lowest 5)
    h. Marketplace Commission e.g., (Default: 15%)
    i. Marketplace Closing Cost e.g., (Default: $1.35)
    j. Average Tax Percentage e.g., (Default: 5.175%), and/or
    k. Target Resale Margin e.g., (Default: 60%).

2) Next, using price collater/arbiter 203, a determination is made as to whether a book is a candidate for purchase by evaluating its Marketplace Sales Rank against the set Maximum Sales Rank Threshold and ensuring the Marketplace Lowest Price Calculation lies at or above the Minimum Marketplace Selling Price.

3) If the book is considered saleable by passing the above criteria, using the price collater/arbiter 203, a base purchase price is calculated. One example of calculating the base purchase price is as follows:
    a) Cost of Marketplace Sale=(Marketplace Lowest Price Calculation (Marketplace Commission Percent+Average Tax Percent))+Marketplace Closing Cost
    b) Marketplace Net Revenue=Marketplace Lowest Price Calculation−Cost of Marketplace Sale
    c) The mobile item-purchasing device purchase price=Marketplace Net Revenue*(1−Target Resale Margin)

4) The RRB is then applied to the mobile item-purchasing device purchase price. The RRB reduces (or increases) the mobile item-purchasing device purchase price according to a sales rank evaluation tier based on the item's percent of maximum sales rank. This is designed to account for the risk (or opportunity) in market shift on price and salability over time.

5) Finally, the mobile item-purchasing device purchase price is displayed on the respective mobile item-purchasing device.

As noted earlier, in some embodiments, the mobile item-purchasing device is GPS-enabled and therefore its location can be tracked. The GPS feature can be used for certain specific purposes, which include the following:

1) Inhibiting Item-Purchasing Functions within a Predetermined Zone

To protect a college bookstore's existing walk-in business, for example, mobile item-purchasing devices used by affiliates of the college bookstore can be configured such that their item-purchasing functions are inhibited when the device is within a predetermined radius from the college bookstore. In general, this feature can be used for a number of reasons such as preventing item-purchasing transactions from occurring in certain areas of a city or college campus, for example.

2) Hot Spot Buying

In general, a mobile item-purchasing device can be configured to automatically send a message to at least one other mobile item-purchasing device based on one or more predetermined conditions. One such condition can be "hot spot buying," which, in general, is purchasing activity at a rate higher than a predetermined threshold (for example, items purchased from ten different sellers in a 30-minute period) in a particular mobile item-purchasing device. Thus, in some embodiments, when a particular mobile item-purchasing device experiences purchasing activity beyond a predetermined threshold, it automatically sends messages to other mobile item-purchasing devices within a predetermined radius from the mobile item-purchasing device, for example, notifying the other devices of the location of the hot spot. In some embodiments, instead of waiting for the automatic message to be sent, a user of the mobile item-purchasing device can send a hot spot notification message (or purchasing assistance request) at the user's discretion such as, for example, by pressing a pre-programmed button on the mobile item-purchasing device. In general, the mobile item-purchasing device provides area-based messaging capabilities, which includes selecting a particular area and sending a message to all mobile item-purchasing devices in that area. Thus, a message can be sent from a particular mobile item-purchasing device indicating that a hot spot condition at a particular location no longer exists, for example. It should be noted that, in some embodiments, any mobile item-purchasing device is capable of displaying a map showing a location of a hot spot and is also capable of providing directions to the hot spot.

As described earlier, mobile device 200 is capable of communicating with an inventory control system of a bookstore to provide purchasing information substantially in real-time. In some embodiments, this communication feature can be used to protect from overbuying in a real-time fashion. For example, if a particular book is on a home store's buying list and if the buying list reflects that only one of that particular book is desired, the system is capable of limiting the number of purchases of that particular book to one. Specifically, if the mobile device 200 is currently being used to purchase the particular book and if a student enters the home store with another copy of the same book, which is scanned in the home store a few seconds after completion of the purchase with the mobile device, the purchase of the particular book would be prevented in the home store by, for example, reducing the buying price of the particular book to 0 in the inventory control system. In some embodiments, the buying price for a particular book is inversely proportional to the number of purchased copies of the particular book. In general, the demand for books is managed in real-time between the mobile device and the home store.

The embodiments described above indicate that the mobile device is associated with a single home store of a bookstore. However, in some embodiments, the mobile device is configured to purchase books for one or more locations of the bookstore other than the home store. In such embodiments, when books are purchased for a location other than the home store, reconciliation of books purchased for the other location(s) can be carried out at the home store. The reconciled purchased books are then transferred to the other location(s). In general, a mobile item device can be used to buy for a home store or any other information source with which it is capable of communicating.

Although the disclosed mobile item-purchasing system and associated method has been described with reference to preferred embodiments, workers skilled in the art will recognize that changes may be made in form and detail without departing from the spirit and scope of the disclosure. It should be noted that although most of the above embodiments describe the purchasing books for bookstores, the teachings of the above disclosure are applicable for any suitable item-purchasing system. In general, all software programs and data used in the above-described embodiments are stored on computer storage media. Processors execute the software and therefore help perform any calculations required by the software program code. Mobile device 200 may be a mobile telephone, a laptop a personal digital assistant (PDA) or any other suitable portable device.

What is claimed is:

1. A method comprising:
   receiving, in a mobile item-purchasing device, identification information from a physical item for sale by a seller;
   electronically matching, via the mobile item-purchasing device, the item for sale with an item on a buying list of an inventory control system in response to entering the identification information for the item for sale into the mobile item-purchasing device;
   electronically obtaining, via the mobile item-purchasing device, a purchase price for the item for sale;
   purchasing the item via the mobile item-purchasing device utilizing the electronically obtained purchase price;
   determining, via the mobile item-purchasing device, a hot spot buying condition when purchasing activity by the mobile item-purchasing device occurs at a rate higher than a predetermined purchasing activity threshold;
   identifying, via the mobile item-purchasing device, a location of the mobile-item purchasing device associated with the hot spot buying condition as a hot spot buying location; and
   based on the determination of the hot spot buying condition, automatically sending a purchasing assistance message from the mobile item-purchasing device to at least one other mobile item-purchasing device notifying the at least one other mobile item purchasing of the hot spot buying location.

2. The method of claim 1 and further comprising utilizing the mobile item-purchasing device to issue a payment to the seller for the item.

3. The method of claim 2 and further comprising enabling the mobile item-purchasing device to issue the payment using at least one of a pre-paid debit card technique, a paper check-based technique, an electronic payment technique and a cash transaction technique.

4. The method of claim 1 wherein entering identification information for an item for sale by a seller into a mobile item-purchasing device comprises scanning a barcode on the item for sale with a barcode scanner integrated with the mobile item-purchasing device.

5. The method of claim 1 and wherein the mobile item-purchasing device is Global Positioning System (GPS)-enabled.

6. The method of claim 5 and further comprising determining a location of the mobile item-purchasing device using the GPS-enabled feature of the mobile item-purchasing device.

7. The method of claim 6 and further comprising utilizing the location of the mobile item-purchasing device to determine a nearest price source for obtaining the purchase price for the item for sale.

8. The method of claim 7 wherein electronically obtaining, via the mobile item-purchasing device, the purchase price for the item for sale comprises receiving the purchase price for the item for sale from the nearest price source.

9. The method of claim 5 and further comprising inhibiting the mobile item-purchasing device from carrying out item-purchasing transactions in at least one predetermined zone.

10. The method of claim 1 wherein the item for sale is a book and wherein the mobile item-purchasing device is operated by an affiliate of a bookstore.

11. The method of claim 10 and further comprising inhibiting the mobile item-purchasing device from carrying out item-purchasing transactions based on a predetermined radius from the bookstore.

12. The method of claim 10 and further comprising utilizing a price list of the bookstore as a price source for obtaining the purchase price for the item for sale.

13. The method of claim 1 wherein the buying list and the purchase price are obtained from a same source.

14. An item purchasing system comprising:
   a datacenter comprising:
      a price arbiter; and
      a payment processing component; and
   a mobile item-purchasing device configured to:
      receive identification information from a physical item for sale by a seller;
      employ the identification information for the item for sale to electronically match the item for sale with an item on a buying list of an inventory control system;
      utilize the identification information for the item for sale to electronically obtain, from the price arbiter, a purchase price for the item for sale; and operate in conjunction with the payment processing component to execute a payment for the item for sale;

determine a hot spot buying condition when purchasing activity by the mobile item-purchasing device occurs at a rate higher than a predetermined purchasing activity threshold;

identify a location of the mobile-item purchasing device associated with the hot spot buying condition as a hot spot buying location; and based on the determination of the hot spot buying condition, automatically send a purchasing assistance message from the mobile item-purchasing device to at least one other mobile item-purchasing device notifying the at least one other mobile item purchasing of the hot spot buying location.

15. The item purchasing system of claim 14 wherein the mobile item-purchasing device is Global Positioning System (GPS)-enabled.

16. The item purchasing system of claim 15 wherein the datacenter is configured to utilize the GPS-enabled feature of the mobile item-purchasing device to determine a location of the mobile item-purchasing device and, based on the location of the mobile item-purchasing device, to determine a nearest price source for obtaining the purchase price for the item for sale.

17. The item purchasing system of claim 14 wherein the payment processing component is configured to communicate with a card management system, which is external to the item purchasing system, to execute a pre-paid debit card payment option.

18. A book acquisition method comprising:

meeting a book supplier at a residence of the book supplier;

entering identification information from a book for sale by the book supplier, at the residence of the book supplier, into a mobile item-purchasing device;

electronically matching, via the mobile item-purchasing device, the book for sale with a book on a buying list of an inventory control system in response to entering the identification information for the book for sale into the mobile item-purchasing device;

electronically obtaining, via the mobile item-purchasing device, a purchase price for the book for sale;

utilizing the electronically obtained purchase price as a guide price for purchasing the book for sale from the book supplier;

utilizing the mobile item-purchasing device to issue a payment to the book supplier for the book at the residence of the book supplier;

determining, via the mobile item-purchasing device, a hot spot buying condition when purchasing activity by the mobile item-purchasing device occurs at a rate higher than a predetermined purchasing activity threshold;

identifying, via the mobile item-purchasing device, a location of the mobile-item purchasing device associated with the hot spot buying condition as a hot spot buying location; and based on the determination of the hot spot buying condition, automatically sending a purchasing assistance message from the mobile item-purchasing device to at least one other mobile item-purchasing device notifying the at least one other mobile item purchasing of the hot spot buying location.

\* \* \* \* \*